United States Patent [19]

Hashimoto et al.

[11] Patent Number: 5,266,542
[45] Date of Patent: Nov. 30, 1993

[54] SYNTHETIC FILM OF ZEOLITE CRYSTAL BODY AND METHOD FOR MANUFACTURING THE ZEOLITE FILM

[75] Inventors: Kenji Hashimoto, Tsuzuki; Takao Masuda, Uji; Atsushi Sato, Ama; Shuichi Yoshida, Handa, all of Japan

[73] Assignee: NGK Insulators, Ltd., Japan

[21] Appl. No.: 858,156

[22] Filed: Mar. 27, 1992

[30] Foreign Application Priority Data

Mar. 29, 1991 [JP] Japan .................................. 3-89141
Feb. 14, 1992 [JP] Japan .................................. 4-59179

[51] Int. Cl.$^5$ .......................... B01J 29/06; B01J 37/00
[52] U.S. Cl. ........................................................ 502/64
[58] Field of Search .................................... 502/64, 4

[56] References Cited

U.S. PATENT DOCUMENTS

| | | | |
|---|---|---|---|
| 3,244,643 | 4/1966 | Schwartz | 252/455 Z |
| 3,468,815 | 9/1969 | Cole et al. | 502/64 |
| 3,701,629 | 10/1972 | Maness | 423/329 |
| 3,730,910 | 5/1973 | Albers et al. | 252/455 Z |
| 4,164,551 | 8/1979 | Elliott, Jr. | 423/330 |
| 5,100,596 | 3/1992 | Haag et al. | 502/64 |

FOREIGN PATENT DOCUMENTS 0428052  5/1991  European Pat. Off. .

OTHER PUBLICATIONS

Patent Abstracts of Japan vol. 13, No. 119 (D-579)(3467) Mar. 23, 1989 and JP-A63,291,809 (Idemitsu Kosan Co Ltd) Nov. 29, 1988.
Zeolites: Facts, Figures, Future, 1989, p. 887, "Molecular Sieve Films from Zeolite Silica Microcomposites", T. Beine, K. Brown and C. J. Brinker.

*Primary Examiner*—Carl F. Dees
*Attorney, Agent, or Firm*—Parkhurst, Wendel & Rossi

[57] ABSTRACT

A synthetic film including a porous; the alumina substrate containing more than 90 wt % of alumina pores in the alumina substrate have a mean diameter of 0.1~3.0 μm. A zeolite crystal body is formed in the pores and on the substrate. The synthetic film is manufactured by preparing the alumina substrate, immersing the substrate in a slurry containing zeolite crystal and its precursor prepared from a silica source using sodium silicate or water glass, and subjecting the substrate with slurry to a hydrothermal crystallization at least one.

4 Claims, 7 Drawing Sheets

FIG_1
FIG_2
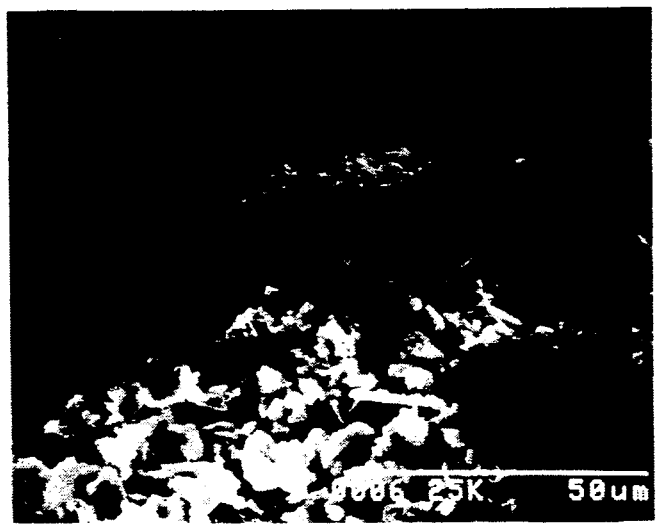

FIG_5

FIG_8
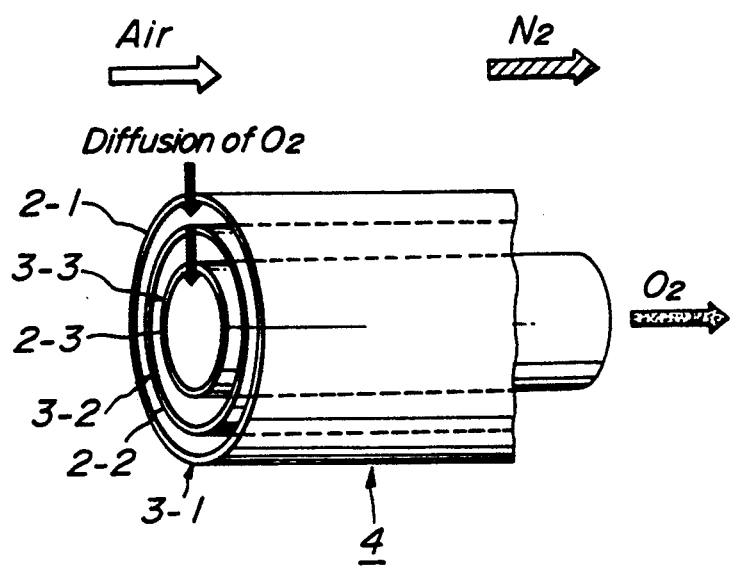

SYNTHETIC FILM OF ZEOLITE CRYSTAL BODY AND METHOD FOR MANUFACTURING THE ZEOLITE FILM

BACKGROUND OF THE INVENTION

1. Field of the Invention

The present invention relates to a synthetic film of zeolite crystal body for use in separating a useful component from a mixture and a method for manufacturing the zeolite film. The synthetic film according to the invention provides not only a high separation efficiency due to ceramic pores, but also molecular sieving properties and properties as a catalyst of zeolite.

2. Related Art Statement

Conventional process for separating a useful component from a mixture are known, such as by distillation filtration, and adsorption. In the distillation process, since the mixture should be heated up in order to separate the useful component therefrom, the method has a disadvantage in consuming energy. Further, the method has other disadvantages in that the apparatus for performing the distillation method is relatively large; it is difficult to separate the useful component when its boiling point is close to the other of components, and the distillation cannot be applied to the mixture having a low vapor pressure and low heat resistance properties.

In the filtration process, there are also drawbacks such as the hydrocarbon polymer membrane cannot be put into wide use, a small molecular component cannot be separated from the mixture and the filter per se does not have heat resistance properties and high strength. Further, in the adsorption process, the apparatus is relatively large, and it is difficult to separate a highly concentrated useful component from the mixture, since the useful component is separated from the mixture with the aid of equilibrium in adsorption.

The conventional methods mentioned above are mainly used for separating and refining reactants and products of reactions. Recently, a synthetic inorganic film comprising zeolite crystal held on a ceramic supporting body has been developed. Zeolite, alminosilicate crystal, is widely used as powder in form for molecular-sieve, catalyst, etc. However, with this synthetic film, reaction of the mixture can be performed, and then the products successively separated. Such synthetic film is, for instance, disclosed in Japanese Patent Preliminarily Publication Nos. 61-107902, 1-148771 and 3-112808.

However, in these publications, there is no detailed description concerning an optimum condition of the ceramic supporting body and zeolite held thereon, which constitutes the synthetic film, and the method for manufacturing such synthetic film having the optimum condition. Furthermore, according to the method disclosed in these publications, a highly densified film cannot be obtained. Therefore, the separating and refining cannot be performed successively in reaction of the mixture with such synthetic film, and a synthetic film having high strength cannot be obtained. Further, in the synthetic film, zeolite is held on a honeycomb-like ceramic substrate with pores having a mean diameter of several millimeters or more. The purpose for holding a zeolite on such a substrate is not to utilize the zeolite as a filter but to reduce the pressure loss. Thus it is not possible to separate the useful component from the mixture with the aid of pores having a mean diameter of smaller than ten Å, formed in the zeolite crystal.

SUMMARY OF THE INVENTION

The present invention has for its object to provide a synthetic film of zeolite crystal body having high strength, by which the separation and refining of a useful component can be performed successively with high efficiency in reaction of a mixture containing the useful component, and to provide a method for manufacturing such film.

A synthetic film using zeolite crystal body according to the present invention comprises:

a substrate with pores, the substrate more than 90 wt % of alumina, diameters of said pores being about $0.1 \sim 3.0$ μm; and zeolite crystal body being formed in said pores of said substrate and on said substrate with a high density.

Further, a method for manufacturing synthetic film of zeolite crystal body according to the present invention comprises the following steps:

preparing a substrate with pores, having diameters in the range of about $0.1 \sim 3.0$ μm, the substrate comprising more than 90 wt % of alumina;

immersing at least one surface of said substrate into a slurry comprising zeolite crystal body and a precursor thereof prepared from a silica source of silicate sodium or water glass; and subjecting said substrate coated with the slurry to hydrothermal crystallization at least once.

In the present invention, the synthetic film comprises a substrate with pores for supporting a zeolite crystal body; the substrate has a given composition and pores therein having given diameters; and the zeolite crystal body is formed in the pores and on the surface of said substrate with a high density. Therefore, the separation and refining of the useful component can be performed in the reaction of the mixture containing the useful component to be separated and refined, and further, the strength of the synthetic film is high. That is to say, since the interatomic distance of alumina is similar to that of zeolite, when alumina is used as a material of the ceramic substrate the alumina and the zeolite crystal body are strongly bonded to each other. As a result, the zeolite crystal body is prevented from peeling from the substrate.

When the purity of alumina in the substrate is less than 90 wt % and an impurity such as CaO is increased therein, the interatomic distance of a substance constituting the substrate is substantially changed from that of the zeolite crystal body. Accordingly, bonding strength between the zeolite crystal body and the substrate becomes so weak that the synthetic film, whose substrate is constituted of less than 90 wt % of alumina and the impurities, could not to be put in a practical use. Further, since the crystal diameter of the zeolite crystal body obtained by the hydrothermal crystallization method according to the present invention is about $0.2-5.0$ μm, when the mean diameter of pores formed in the alumina substrate is less than 0.1 μm, almost no zeolite crystal body is formed in the pores, so that the zeolite crystal body can not be firmly fixed to the alumina substrate. On the other hand, when the mean diameter of pores exceeds 3.0 μm, the zeolite crystal body can be formed in the pores but the inside of the pores are not filled with the zeolite crystal body with a high density. In such a case, voids would be generated in the pores and unevenness of the zeolite film would be formed on the surface of the substrate and then the efficiency of the synthetic film would be affected.

Furthermore, according to the method for manufacturing the synthetic film of the present invention, the synthetic film is manufactured by the steps of; preparing a substrate of at least 90 wt % alumina, the substrate having, whose mean diameter is between 0.1~3.0 μm, of immersing at least one surface of said substrate into a slurry comprising zeolite crystal body and a precursor thereof prepared from a silica source of silicate sodium or water glass; and subjecting said substrate with slurry to a hydrothermal crystallization at least once. Therefore, the zeolite crystal body can be strongly bonded in the pores formed in the alumina substrate and on the alumina substrate; and the strength of the thus obtained synthetic film becomes high. The hydrothermal crystallization is preferably performed in such a manner that the substrate with slurry is subjected to a temperature of 70°~90° C. for a duration of 15 minutes to twelve hours to obtain a synthetic film of an A-type zeolite crystal body and the substrate with slurry is held in an autoclave at a temperature of 160°~200° C. for 24 to 72 hours to obtain a synthetic film of ZSM-5 zeolite crystal body.

BRIEF DESCRIPTION OF THE DRAWINGS

FIG. 1 is an electron micrograph showing a structure of particles in a cross sectional area of a synthetic film of an A-type zeolite crystals formed on the outer surface of the ceramic filter according to the invention;

FIG. 2 is an electron micrograph showing a structure in a cross sectional area of a synthetic film of ZSM-5 zeolite crystals formed on the outer surface of the ceramic filter according to the invention;

FIG. 8 is a schematic view illustrating a cell for separating oxygen from air in which the synthetic film of zeolite crystal body according to the invention is applied.

DETAILED EXPLANATION OF THE PREFERRED EMBODIMENTS

FIG. 1 is an electron micrograph showing a cross sectional structure of a synthetic film of an A-type zeolite crystal body according to the present invention; and FIG. 2 is an electron micrograph showing a cross sectional structure of a synthetic film of ZSM-5 zeolite crystal body according to the invention. Highly densified zeolite film is formed in pores of the alumina substrate and on the outer surface of the substrate is clearly observed in FIGS. 1 and 2.

Figure 3:
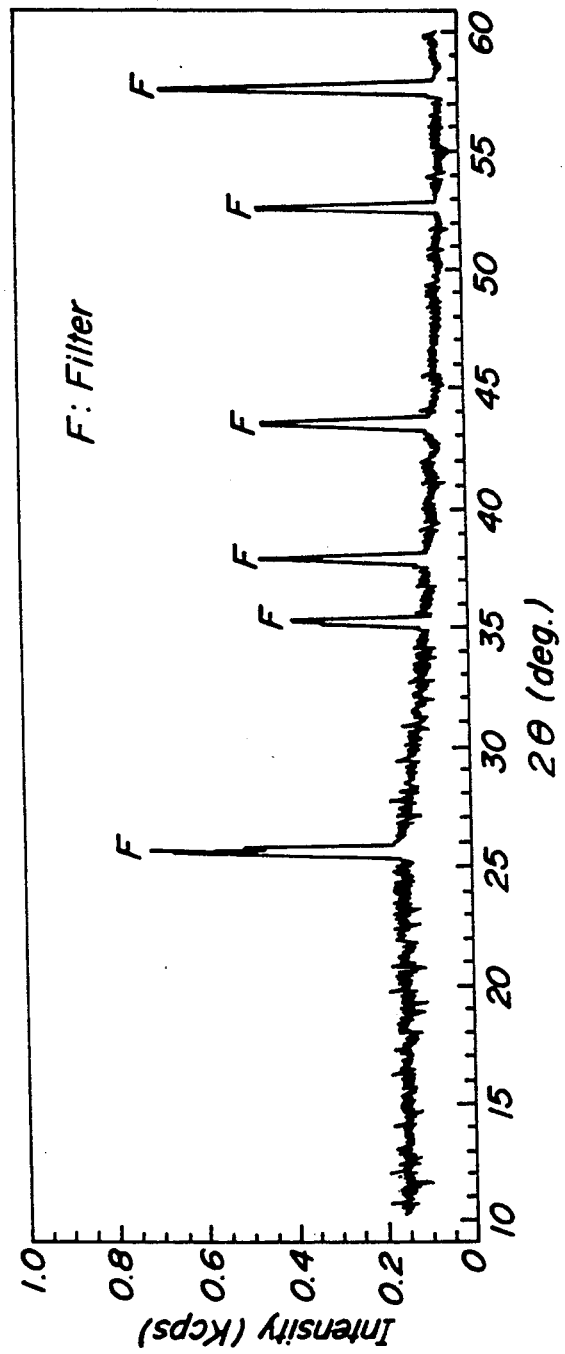
FIG. 3 is a schematic view illustrating an X ray diffraction pattern when an X ray is irradiated on an alumina filter without zeolite crystal film.
Figure 4:
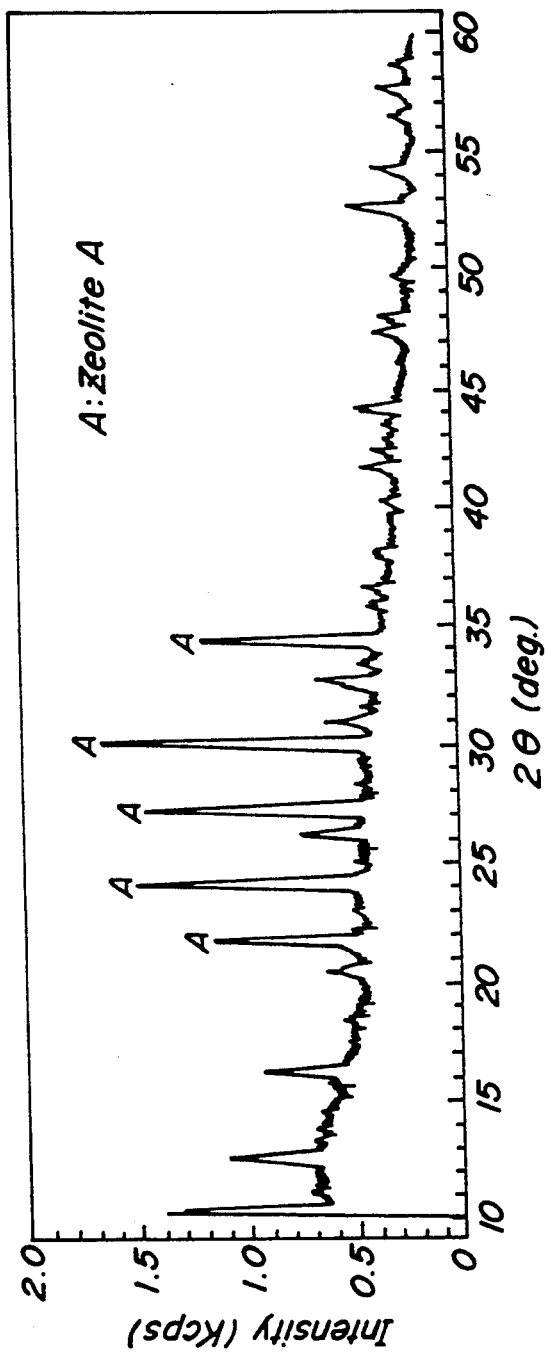
FIG. 4 is a schematic view illustrating an X ray diffraction pattern when an X ray is irradiated on an A-type zeolite crystal film.
Figure 5:
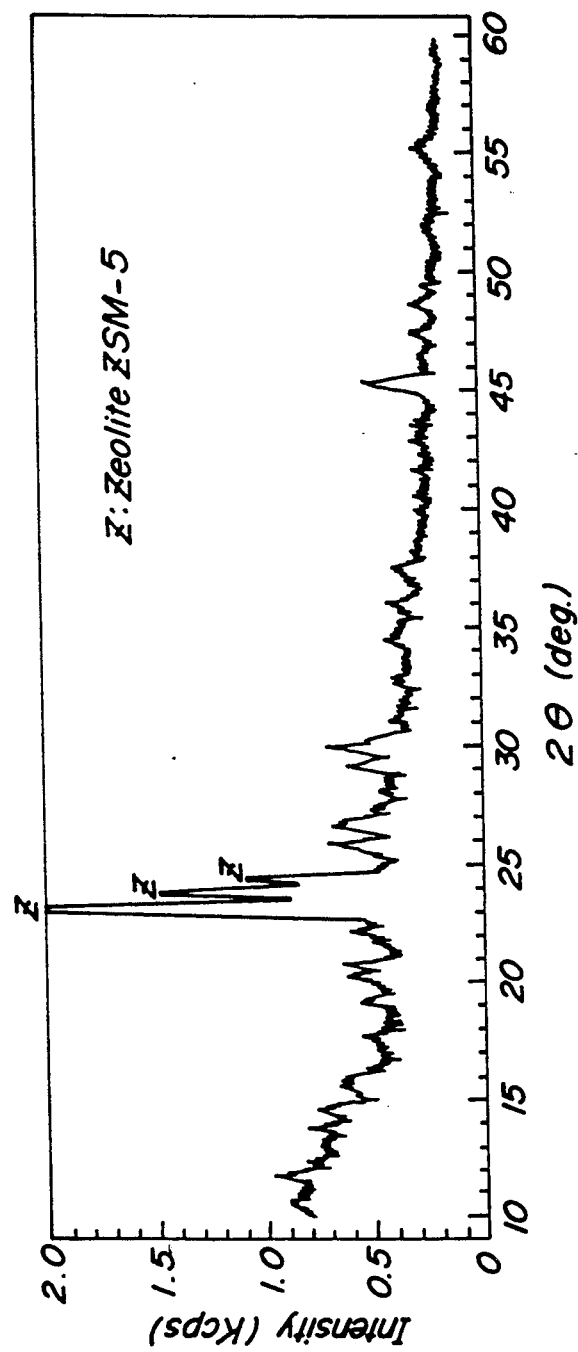
FIG. 5 is a schematic view illustrating an X ray diffraction pattern when an X ray is irradiated on a ZSM-5 zeolite crystal film.
Figure 6:
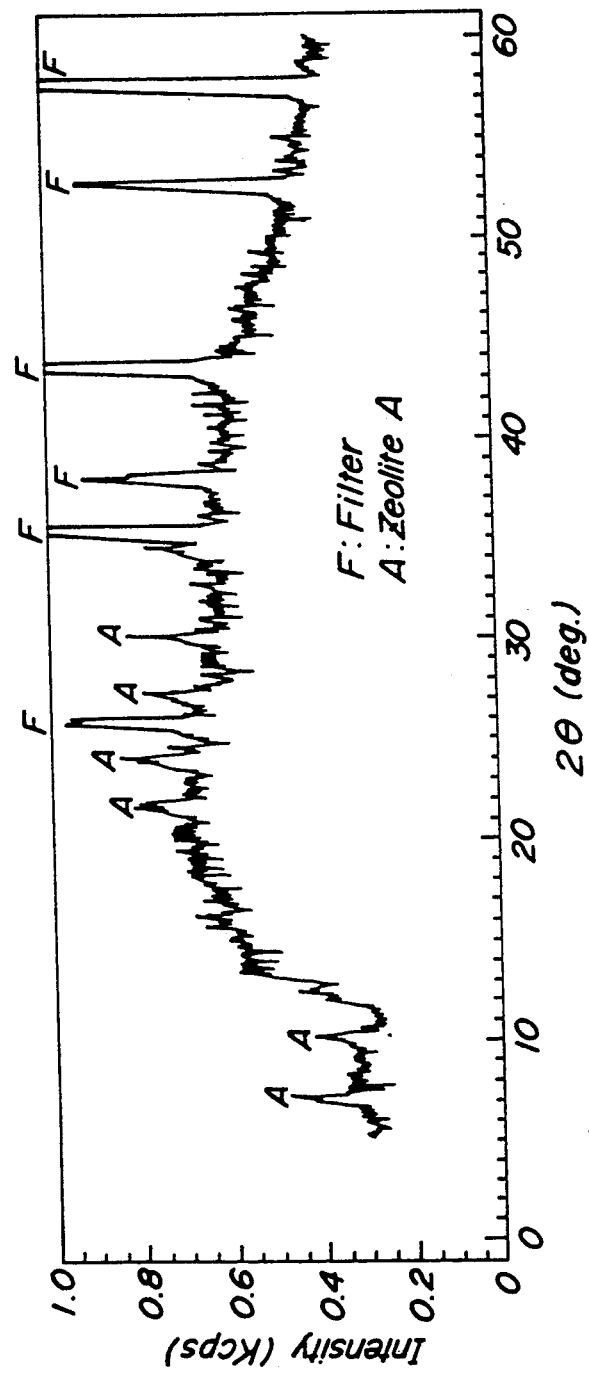
FIG. 6 is a schematic view illustrating an X ray diffraction pattern when an X ray is irradiated on a synthetic film of A-type zeolite crystal body formed on the outer surface of the ceramic filter.
Figure 7:
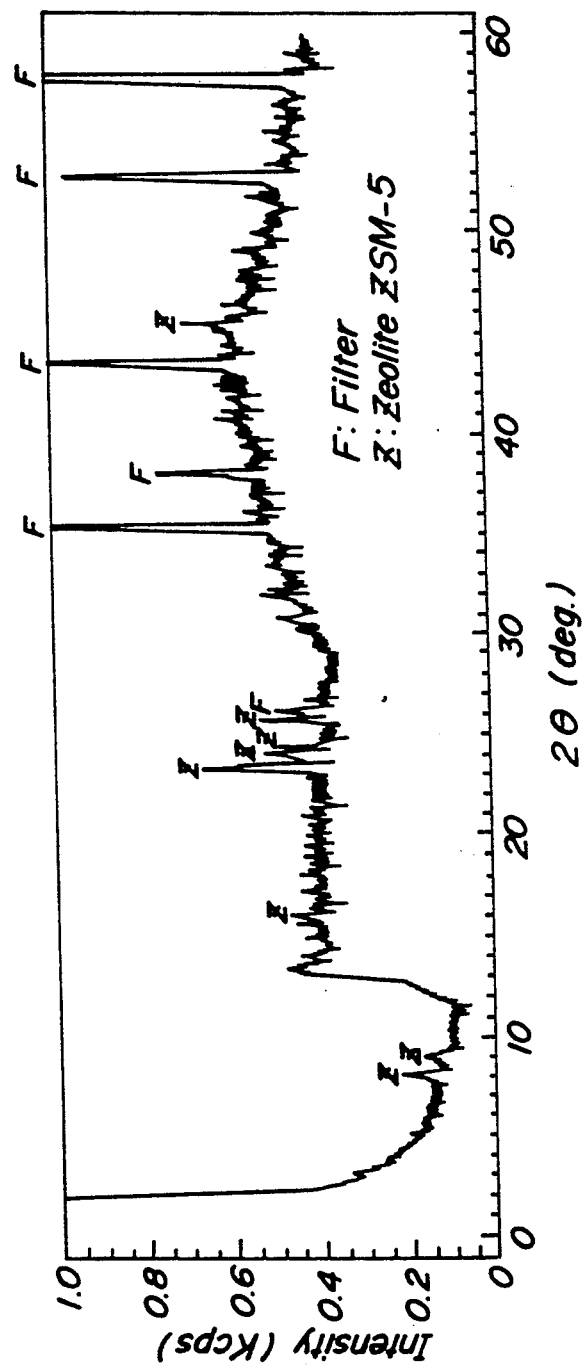
FIG. 7 is a schematic view illustrating an X ray diffraction pattern when an X ray is irradiated on a synthetic film of a ZSM-5 zeolite crystal body formed on an alumina substrate.

FIGS. 3, 4 and 5 are schematic views representing X ray diffraction patterns when an X ray is irradiated on the alumina filter an A-type zeolite crystal body, and ZSM-5 zeolite crystal body, respectively. FIGS. 6 and 7 are schematic views illustrating X ray diffraction patterns when an X ray is irradiated on synthetic films of an A-type zeolite crystal body of ZSM-5 zeolite crystal body, respectively, which are formed on the alumina filter substrates.

Known Y-type zeolite A-type zeolite or ZSM-5 zeolite, which are made of crystals of aluminosilicate, is preferably used to obtain the zeolite crystal body. It should be noted that these types of zeolite have a heat resistance up to at least a temperature of 700° C. By the synthetic film according to the present invention, a separation of a useful component contained in a mixture and a reaction of the mixture with the zeolite are effected at the same time, when the mixture is passed through the pores formed in the alumina substrate and the zeolite crystal body formed in the pores and on the outer surface of the substrate.

FIG. 8 is a perspective view a cell for separating oxygen from air in which a synthetic film according to the invention is applied. As shown in FIG. 8, the cell 4 comprises three differently size cylindrical alumina tubes 2-1, 2-2, 2-3. On the surface of the outer large-size alumina tube 2-1 is formed a synthetic film of 3-1 zeolite crystal body, on the surface of the intermediate middle-size alumina tube 2-2 a synthetic film of 3-2 zeolite crystal body, and on the surface of the inner small-size alumina tube 2-3 a synthetic film of 3-3 zeolite crystal body, respectively. When air is introduced on the surface of the large-size alumina tube 2-1 at a high pressure, oxygen contained in the air is diffused into the films of the tubes 2-1, 2-2, 2-3, successively in this order. The oxygen is purified during passage through each tube so that oxygen having a high purity can be continuously obtained from the inside of the inner alumina tube 2-3.

Further, the synthetic film according to the present invention can be applied to separate and refine an isomer from butene isomer, whose chemical properties and boiling points are very similar. In this case, the isomer can be separated and refined from butene isomer without using a large reaction vessel and a distillation column.

The synthetic film according to the present invention can also be applied to a sensor for detecting a substance having a small molecular diameter which can be diffused into the zeolite crystal body film. Such a sensor comprises a cylindrical alumina tube, inside of which is provided a sensor element for detecting a reducing material and outside of which is arranged a synthetic film of zeolite crystals body having a molecular sieving effect. Such a sensor can be utilized, for instance, to detect an n-paraffin from a mixture of isoparaffin and n-paraffin. It should be noted that the chemical properties of n-paraffin and isoparaffin are very close to each other and thus conventionally, it has been very difficult to discriminate those materials.

One embodiment of a method for manufacturing a synthetic film of zeolite crystal body is explained as follows.

An alumina substrate, in which a mean diameter of pores is about 1~2 μm and a purity is 99.9%, was prepared. The substrate was formed to obtain plate-like substrates of 30×30×3 mm or cylindrical substrates having an outer diameter of about 10 mm, thickness 2~3 mm and length 100 mm. To obtain several types of synthetic films on the substrates, zeolite crystals and its precursor are prepared from a mixture of a liquid of sodium silicate powder or water glass, aluminum sulfate or aluminum hydroxide, NaCl and water. The thus obtained crystals and precursor are applied on the alumina substrates and then put it in an autoclave of 300~500 cc. In the autoclave, the alumina substrate with zeolite crystals and precursor were subjected to a hydrothermal crystallization to synthesize a zeolite film in the pores of the alumina substrate and on the outer surface of the alumina substrate. It should be noted that in order to synthesize a film of ZSM-5 zeolite crystal body, a template should be contained in the mixture liquid. The temperatures and hours of the hydrothermal crystallization were set up as shown in the following Table to obtain synthetic films in the scope of the present invention and out of the scope of the present invention. In some of the examples in the Table, the hydrothermal crystallization was repeated several times. Further, in some of the examples, a silica gel was applied on the surface of the zeolite film and then sintered in air at a temperature of 500° C. to form a porous silica gel film on the zeolite film in order to increase abrasion resistance of the zeolite crystal body.

TABLE 1

| | | Type of zeolite shape of substrate Diameter of pores | Hydrothermal crystallization condition | | Number of times of hydrothermal crystallization | Density of zeolite film |
|---|---|---|---|---|---|---|
| | | | temperature | time | | |
| Present invention | 1 | ZSM-5 plate 1~2 μm | normal temp. → 200° C. 200° C. Keep | 24 Hr 72 Hr | 1 | good |
| | 2 | ZSM-5 cylindrical 1~2 μm | normal temp. → 200° C. 200° C. Keep | 24 Hr 72 Hr | 1 | good |
| | 3 | ZSM-5 cylindircal 1~2 μm | normal temp. → 200° C. 200° C. Keep | 24 Hr 48 Hr | 1 | good |
| | 4 | ZSM-5 cylindrical 1~2 μm | normal temp. → 200° C. 200° C. Keep | 24 Hr 48 Hr | 2 | excellent |
| | 5 | ZSM-5 cylindrical 1~2 μm | normal temp. → 200° C. 200° C. Keep | 24 Hr 48 Hr | 3 | excellent |
| | 6 | ZSM-5 cylindrical 1~2 μm | normal temp. → 200° C. 200° C. Keep | 24 Hr 48 Hr | 4 | excellent |
| | 7 | A cylindircal 1~2 μm | normal temp. → 80° C. 80° C. Keep | 3 Hr 9 Hr | 1 | good |
| | 8 | A cylindrical 1~2 μm | normal temp. → 80° C. 80° C. Keep | 15 min. 12 Hr | 1 | good |
| | 9 | A cylindrical 1~2 μm | normal temp. → 90° C. 90° C. Keep | 15 min. 6 Hr | 1 | good |
| | 10 | A cylindrical 1~2 μm | normal temp. → 90° C. 90° C. Keep | 15 min. 6 Hr | 2 | excellent |
| | 11 | A cylindrical 1~2 μm | normal temp. → 90° C. 90° C. Keep | 15 min. 6 Hr | 3 | excellent |
| | 12 | A cylindrical 1~2 μm | normal temp. → 90° C. 90° C. Keep | 15 min. 6 Hr | 4 | excellent |
| Comparative example | 1 | ZSM-5 plate 3~5 μm | normal temp. → 200° C. | 24 Hr 72 Hr | 1 | bad |
| | 2 | ZSM-5 cylindrical 3~5 μm | normal temp. → 200° C. 200° C. Keep | 24 Hr 72 Hr | 1 | bad |
| | 3 | ZSM-5 ZrO$_2$ substrate cylindrical 1~5 μm | normal temp. → 200° C. 200° C. Keep | 24 Hr 72 Hr | 1 | bad |
| | 4 | ZSM-5 MgO substrate cylindrical 1~5 μm | normal temp. → 200° C. 200° C. Keep | 24 Hr 72 Hr | 1 | bad |

As clearly shown in the Table, when the hydrothermal crystallization was conducted at a temperature and a time period within the scope of the present invention, a synthetic film having good characteristics was obtained, in comparison with the comparative examples of the synthetic films which were manufactured under the hydrothermal crystallization condition outside the scope of the present invention.

The present invention is not limited to the above mentioned embodiments, but many modifications and alterations can be applied. For instance, in the embodiment, the alumina substrate having its purity of 99.9% is used to manufacture the synthetic film, but an alumina substrate having a lower purity can be used so far as the mean diameter of the alumina substrate is in the scope of the present invention.

In the present invention, the synthetic film is obtained in such a manner that zeolite crystal body is formed on the alumina substrate having a given composition with the aid of hydrothermal crystallization. Therefore, the zeolite crystal body is bonded to the substrate with a high bonding strength. Therefore, the useful component to be separated from the mixture can be separated and refined with a high efficiency at the same time of the reaction of the mixture. Further, a synthetic film of a zeolite crystal body having a high strength can be obtained.

What is claimed is:

1. A synthetic film, comprising:
   a porous alumina substrate comprising more than 90 wt % of alumina, said porous alumina substrate having an average pore diameter within a range of about 0.1–3.0 μm; and
   a zeolite crystal body formed in the pores of said alumina substrate and along at least one surface of the substrate.

2. The synthetic film of claim 1, wherein the zeolite crystal body comprises one of Y-type zeolite, A-type zeolite and ZSM-5 zeolite.

3. The synthetic film of claim 1, further comprising a silica gel film disposed on the zeolite crystal body.

4. A method for manufacturing a synthetic film, comprising the steps of:
   preparing a porous alumina substrate comprising more than 90 wt % of alumina, said porous alumina substrate having an average pore diameter within a range of about 0.1–3.0 μm;
   immersing at least one surface of said porous alumina substrate into a slurry comprising zeolite crystals and a precursor thereof prepared from a silica source of silicate sodium or water glass; and
   hydrothermally crystallizing said porous alumina substrate supporting said slurry at least once.

* * * * *